Patented Dec. 30, 1930

1,786,922

UNITED STATES PATENT OFFICE

WALTER SCHOELLER, OF BERLIN-WESTEND, AND HANS JORDAN, OF BERLIN-STEGLITZ, GERMANY, ASSIGNORS TO THE FIRM CHEMISCHE FABRIK AUF ACTIEN (VORM. E. SCHERING), OF BERLIN, GERMANY

PRODUCTION OF THYMOL

No Drawing. Application filed June 20, 1927, Serial No. 200,297, and in Germany June 29, 1926.

Our invention refers to the production of alkyl isopropyl phenols and more especially thymol.

As disclosed in the copending application for patent of the United States filed of even date herewith by Hans Jordan, alkyl isopropylene phenol, such as 3-methyl-6-isopropylene phenol

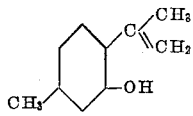

and 4-methyl-6-isopropylene phenol

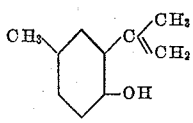

can be obtained by heating the condensation products obtained by causing a ketone, such as acetone, and an alkyl phenol, such as m-cresol and p-cresol, respectively, to react with each other at moderately raised temperature in the presence of hydrochloric acid as a catalyst, to about 300–310° C., to effect decomposition, and subjecting the products of decomposition to fractional distillation, preferably in vacuo.

We have now ascertained that by treating these products with hydrogen in the presence of a suitable catalyst so as to introduce two atoms of hydrogen, we are enabled to convert them into thymol and its isomers and homologues, being the corresponding phenols saturated in the side chain.

Example 1

3-methyl-6-isopropylene phenol is treated with hydrogen at 140–160° C. and, if desired, under pressure in the presence of a mixed hydrogenation catalyst containing Ni and another metal, such as Cu, Co, Fe, and the like, either in reduced state or as carbonates, hydroxides, or the like, until 2 hydrogen atoms have entered the combination. There is thus obtained 3-methyl-6-isopropyl phenol. Hydrogenation catalysts as mentioned above are obtainable by precipitating the salts of catalytically active heavy metals with carbonates or hydroxides of alkali-forming metals (see for instance Sabatier, "Die Katalyse," (1927), page 386).

Example 2

4-methyl-6-isopropylene phenol is treated with hydrogen at 140–160° C. and, if desired, under pressure in the presence of a mixed hydrogenation catalyst containing Ni and another metal, such as Cu, Co, Fe, and the like, either in reduced state or as carbonates, hydroxides, or the like, until 2 hydrogen atoms have entered the combination. There is thus obtained 4-methyl-6-isopropyl phenol (p-thymol).

Various changes may be made in the details disclosed in the foregoing specification without departing from the invention or sacrificing the advantages thereof.

We claim:—

1. The process of producing alkyl isopropyl phenols comprising acting on an alkylisopropylene phenol at about 160° C. in the presence of a hydrogenation catalyst with hydrogen, until 2 hydrogen atoms have entered into combination.

2. The process of producing 3-methyl-6-isopropyl phenol (thymol) comprising acting on 3-methyl-6-isopropylene phenol at about 160° C. temperature in the presence of a hydrogenation catalyst with hydrogen, until 2 hydrogen atoms have entered into combination.

In testimony whereof we affix our signatures.

WALTER SCHOELLER.
HANS JORDAN.